Sept. 6, 1955  E. G. BEARD  2,716,919
PICTURE PROJECTING SYSTEMS AND SCREEN THEREFOR
Filed Dec. 3, 1948  3 Sheets-Sheet 1

INVENTOR:
ERNEST GORDON BEARD
BY Leon M. Strauss
AGT.

INVENTOR:
ERNEST GORDON BEARD

INVENTOR:
ERNEST GORDON BEARD

United States Patent Office 2,716,919
Patented Sept. 6, 1955

2,716,919

PICTURE PROJECTING SYSTEMS AND SCREEN THEREFOR

Ernest Gordon Beard, Willoughby, New South Wales, Australia

Application December 3, 1948, Serial No. 63,317

Claims priority, application Australia December 15, 1947

5 Claims. (Cl. 88—16.6)

This invention relates to systems for the optical projection of pictures or images such as are used for instance in cinematography, for the projection of slides, and in television.

The object of the present invention is to devise a projection system of this kind and a screen therefor, which permit a number of images to be projected onto the screen and to be seen simultaneously without disturbing or undesired interferences between the images. In particular, the system permits pairs of stereoscopic pictures to be perceived on the screen clearly and three-dimensionally by observers positioned in relation to the screen as defined hereafter, without the aid of a "viewer" or other auxiliary devices.

With the projecting system according to this invention it is further possible to produce "all-round" views of objects, i. e. views showing three-dimensional pictures from progressively varying viewpoints.

The system according to the invention also improves generally the light efficiency of image projection if applied to flat, i. e. two-dimensional pictures.

The aforementioned object is achieved by the use in the system of a screen having in substantially even distribution thereon a set of concentric light-ray deflecting elements which are curved, at least in part, across the width of each element (i. e. in transverse cross section), said elements being so located in relation to the projector on the one hand and to a file of (potential) observers on the other hand, that observers in said file who look toward the common centre of the concentric elements, would (if unimpeded) perceive the projector substantially in coincidence with said centre.

The screen used in the system may be non-transparent (reflecting), or refracting, and the concentric elements thereon either light-reflecting or light-refracting. In shape the concentric elements may be either circular (substantially circular) or elliptical and they are preferably in the nature of grooves, ribs or undulations formed or provided on the screen.

The principle of the present invention and various forms of carrying it into effect are by way of example, illustrated in the accompanying drawings, wherein.

Figure 19:
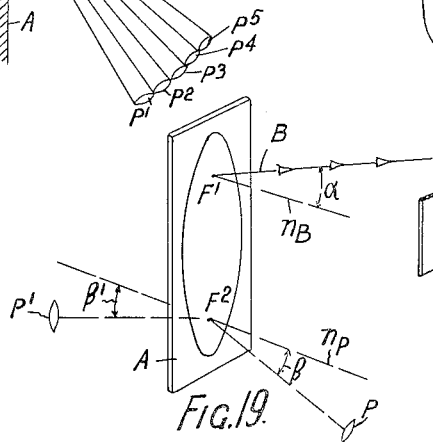
Figure 20:
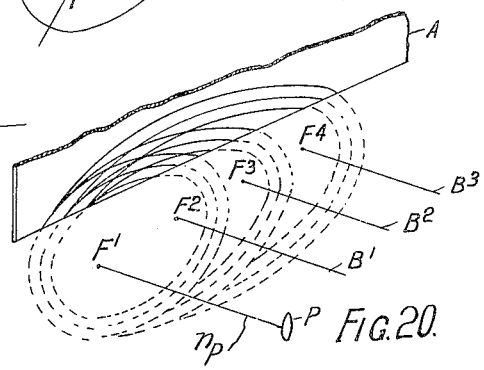

Fig. 19 shows diagrammatically the position of a projector and of a file of potential observers in relation to a reflecting screen and a refracting screen, respectively, the screen being provided with optically effective elements of elliptical shape; and Fig. 20 illustrates diagrammatically the application of sets of optically effective elliptical elements to a screen serving several files of observers.

In order to see two stereoscopic pictures on a screen it is necessary to project them thereon in superimposed relationship, and to provide means whereby each eye of an observer sees only the one picture intended for it.

Generally, for an image formed by a projector and a slide or film therein, to be visible on a reflecting screen, the latter must reflect into the eyes of an observer a multitude of rays of light originating in the projector and striking numerous points scattered over the surface of the screen.

According to the elementary laws of reflection for each reflected ray to be seen the reflector must be placed in such a position that a normal from it at the point where reflection occurs bisects the angle subtended at that point by the observer and the projector. Therefore a plane mirror cannot be used as a projection screen as only one normal complies with this condition. An image however can be seen on a matt screen because such screen is in fact covered with an infinite number of elemental reflectors at all angles and therefore the required conditions for reflection to the eyes of an observer exist at all points.

Stereoscopic pictures, however cannot be viewed correctly on such matt screen because each eye sees images produced by both projectors.

If a stereoscopic picture is to be made visible, for instance, on a reflecting screen, provision must be made to prevent the left eye from seeing the image intended for the right eye, and vice versa. To achieve this effect, reflection from the screen is so controlled, in accordance with the present invention, and the screen so constructed that at no point on its surface does a normal bisect the angle subtended by an eye and the incorrect projector, but that a large number of normals bisect the angle subtended by an eye and the correct projector.

In the case of the present invention the system for the observation of stereoscopic pictures comprises a reflecting or refracting screen devised in a particular manner, and two or more projectors arranged in a particular relationship to a file or files of (potential) observers and vice versa. By referring to two or more projectors I do not mean to exclude the case of a single projector so designed that it may properly project two stereoscopic pictures onto the screen in the required superimposed relationship.

In its simplest form a reflecting screen used in the system according to the present invention is made of sheet material, for instance metal, engraved, embossed or formed otherwise with sets of circular, transversely curved reflecting grooves and/or ribs, or corrugations, concentric with respect to points of intersection with the screen, of lines which indicate the seating files of observers and are drawn approximately at the average eye level of observers in said files. For convenience sake these lines are hereinafter referred to as the axes of the files or shortly as axes.

Figure 1:
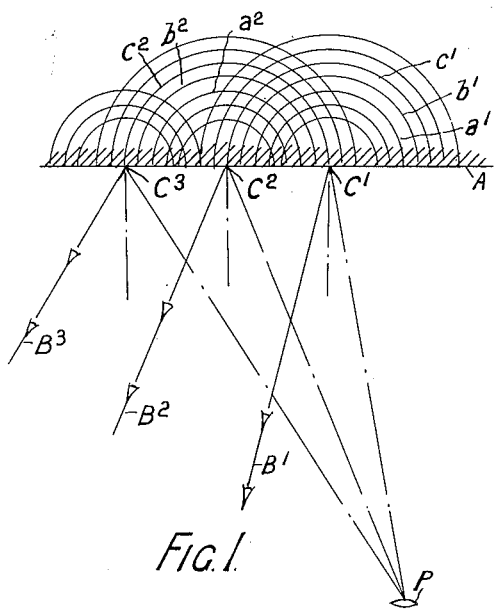
Fig. 1 is a diagrammatic (folded over) plan view showing a screen, a projector, and several files of observers in front of the screen, the figure also including a folded-over plan of the (vertical) screen to illustrate the position of the optically effective elements on the screen relative to said projector and files.

A screen A of this kind is diagrammatically shown in Fig. 1 where $B^1$, $B^2$ . . . indicate the axes of several seating files, and $C^1$, $C^2$ . . . the points of intersection of these axes with the screen A, whilst $a^1$, $b^1$, $c^1$ . . . designate a series of equidistant and concentric circular grooves on the centre $C^1$, and $a^2$, $b^2$, $c^2$ . . . a series of similar grooves on the centre $C^2$. P indicates a projector arranged in front of the screen A.

Figure 2:
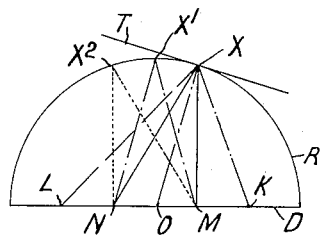
Fig. 2 is a diagram illustrating the properties of a spherical reflector.

In order to arrive at a simple and workable solution of the problem set out above, it is approached by reference to the well-known approximation adopted by designers of optical lenses and spherical reflectors. Referring now to Fig. 2 of the drawings, same represents diagrammatically and in section a spherical reflector R. M and N are two points the same distance apart from the centre O of the reflector, at opposite sides of the centre O and on the diameter D. X is a point on the reflector and T a tangent to the reflector at X. If the distance MN is small in comparison with the radius OX, then MX will approximately equal NX and under this assumption the radius OX will bisect the angle MXN. The tangent T may then be assumed to represent an elemental plane mirror replacing the reflector R at X and it will be manifest that the eye of an observer placed in M will see a reflection of a projector N at all points $X^1$, $X^2$ . . . of the reflector surface for which the approximation made is justifiable. The extent to which this will be so also depends on the area of the lens of the projector at N.

At the same time an eye at K will not receive any reflected rays originating from N because no normal to the reflector bisects the angle NXK. If, however, another projector is placed at L, the distance OL equalling OK, the eye at K will see reflected rays originating from L whilst the eye at M will not.

It will be understood that each eye will see at all points on the reflector where the above mentioned approximation applies, reflections from a particular projector and, moreover, that with the two projectors N, L and with stereoscopic pictures of the same object, the eyes at M, K will see a single three-dimensional picture on the reflector.

Thus the problem is reduced to providing on a screen a number of reflectors of a character substantially described with reference to Fig. 2 in such arrangement that there are at practically all points of the screen normals which bisect the angle subtended by an eye and the correct projector, but so that none bisect the angle by an eye and the incorrect projector.

In the foregoing it has been shown that spherical reflectors are under certain conditions suitable media for the reflection of pairs of pictures of which one is visible to one eye and the second to the other eye only of an observer.

Figure 3:
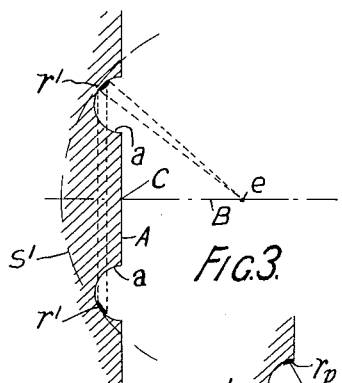
Figs. 3 and 4 are cross sections through a screen showing, respectively, a single groove and rib on said screen in its relationship to the eye of an observer.

Transversely curved circular grooves and ribs may be considered to consist of portions of a series of annular elemental spherical reflectors (concave or convex, respectively) to each of which the above approximations equally apply. This is shown in Fig. 3 for a single circular groove $a$ drawn on a centre C of the screen. For an eye $e$ placed on B the elemental spherical reflector is constituted by a narrow circular band $r^1$ where a hypothetical sphere $S^1$ having its centre at $e$ is tangent to the groove $a$.

Figure 4:
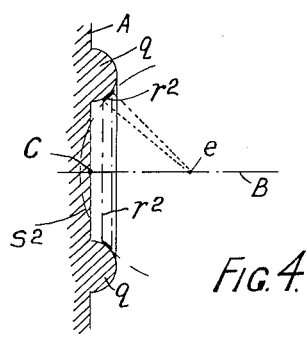

Fig. 4 shows the same for a single circular rib $q$. Here the elemental spherical reflector is represented by $r^2$ to which a sphere $S^2$ on centre $e$ is tangent.

Subject to conditions detailed hereafter, the problem defined above is therefore satisfactorily solved by the provision of transversely curved grooves or ridges arranged on the screen A concentrically with respect to the point C of intersection with the screen of the axis B of a file of observers, which at the same time may be considered to be the axis of the field of vision of the observers in the particular file.

Figure 5:
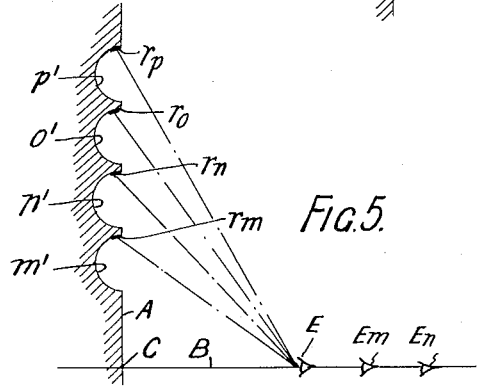
Fig. 5 is a cross-sectional view of a screen showing a series of grooves thereon in their relationship to the eyes of observers.

Fig. 5 shows a single eye E on a file axis B in front of a reflector A on which a number of adjoining grooves $m^1$, $n^1$, $o^1$ and $p^1$ are shown in cross section.

In view of the approximations made with reference to Fig. 2, and on considering further that the distance between the points M and N must be small in comparison to the radius of the reflector, it is quite permissible to represent in Fig. 5 the rays from a projector (not shown) and their reflections into the eye E by single lines passing through the eye and the centres of the semi-circles representing grooves $m^1$, $n^1$, $o^1$, $p^1$ respectively.

Fig. 5 further shows that for an eye and a given reflector (not shown) elemental portions $r_m$, $r_n$, $r_o$, $r_p$ of the successive grooves located in different angular positions are effective.

As the surfaces of the grooves are continuous, they represent an infinite number of such concave reflectors and, therefore, there will be for any observer $E_m$, $E_n$ . . . in the file B sections of the concave mirrors of appropriate focal length to produce a virtual image of the projector for him.

Figure 6:
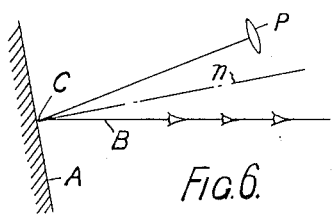
Fig. 6 illustrates the angle of tilt of the screen required in view of a particular arrangement of the projector relative to a file of potential observers.

The foregoing explanations relating to Fig. 5 are more or less based on the assumption that the projector (not shown) lies in the horizontal plane which also contains the file of observers. However in view of the approximations made this is by no means essential. If the projector is not in that plane, all that is required is that the screen A be so tilted that the normal $n$ to the screen plane which passes through the centre C of the concentric elements approximately bisects the angle between the axis B of the file of observers and the rays from the projectors P. An arrangement of this kind is diagrammatically depicted in Fig. 6. The projectors may be above the level of the observers as shown, or below said level. The directions in which the projectors project their images on to the screen has no relationship to the angle of screen tilt.

The tolerances to be observed both in location of the eyes of the observers and in the construction of the screen depend almost entirely on the size of the apertures of the projector lenses and have therefore proved remarkably wide.

Figure 7:
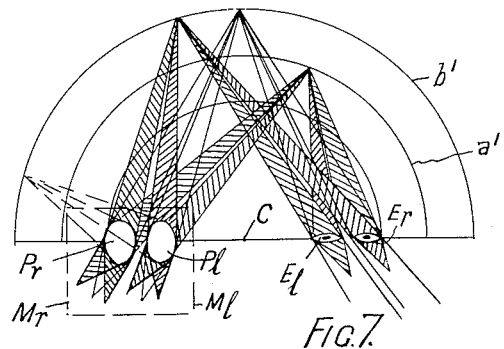
Figs. 7, 8 and 9 are diagrams illustrating various aspects to be considered in the projection of stereoscopic pictures with the system according to this invention.

In Fig. 7 is depicted a front elevation of a section of a screen according to the invention on the assumption that an observer and the projectors for stereoscopic pictures are at the same distance from the screen. The paths of the rays from some points of stereo slides $M_l$, $M_r$, via left and right hand lenses $P_l$ and $P_r$ of the projectors and some reflecting elements $a^1$, $b^1$ of the screen to the eyes $E_l$ and $E_r$ of the observer are shown, and it is evident that in this case the horizontal tolerance for the position for each eye of the observer is the same as the width of the projector lenses.

Figure 8:
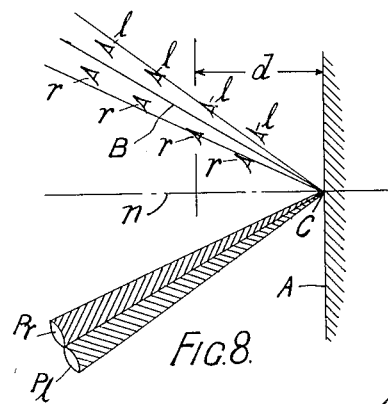

Fig. 8 shows in plan view a given position of a projector having lenses $P_r$ and $P_l$ in relation to screen A and a file B of observers. Provided that the edges of the lenses meet and assuming optical accuracy, and provided further that the heads of the observers are located properly in relation to the axis B, there is no limit to the maximum distances from the screen at which the eyes $l, r$ of observers within the file may be placed. However, if an observer is closer to the screen A than a certain distance $d$, the cone-shaped bundles of rays produced by the lenses $P_r$, $P_l$, may fall between his eyes and in this case the observer is in an unfavourable position for viewing a stereoscopic picture shown on the screen A.

Figure 9:
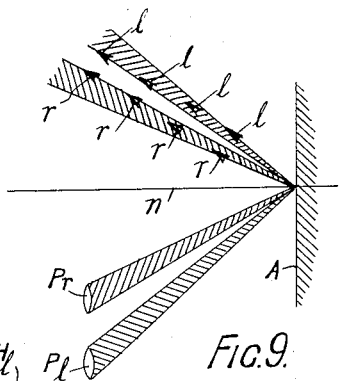

Fig. 9 shows a plan view similar to Fig. 8 of an arrangement wherein the lenses $P_r$ and $P_l$ do not meet. In this case if an observer is at a distance from the screen A which exceeds a certain maximum, his eyes will be located between the cones of rays from the projectors and observation will be impossible.

Therefore, in order to ensure visibility of pictures on the screen from any point in the file the distance of which from the screen exceeds a given minimum, provisions must be made to bring the bundles of rays from the projector lenses $P_r$ and $P_l$ into close relationship.

Figure 10:
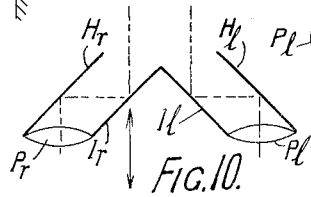
Fig. 10 shows diagrammatically two projectors and mirrors arranged to permit adjustment of the distance between the effective images produced by the projectors.

Fig. 10 represents diagrammatically a simple arrangement of mirrors $H_r$, $H_l$ and $I_r$ and $I_l$ whereby the effective distances between the lenses $P_r$ and $P_l$ can be varied to requirement. It will be understood that by moving the mirrors $I_r$ and $I_l$ backwards or forwards the distance apart of the bundle of light projected from the lenses can be reduced or increased respectively. A similar effect can be obtained by means of prisms.

From Fig. 8 it can be seen that the permissible maximum movement for an observer in a lateral direction is limited by the distance between his eyes. By the use of chairs with properly grooved backs it is possible to confine the movements of observers comfortably within limits in which movement of the head alone cannot carry the eyes outside the permissible boundaries.

As far as movement of an observer in a vertical direction is concerned, it is obvious (in view of the widening of the cone of the reflected rays with the distance from the screen) that the tolerance increases with the distance of the observer from the screen. The initial vertical tolerance depends on the vertical aperture of the projector lenses.

With reference to Fig. 7, where the eyes $E_r$, $E_l$ of an observer are assumed to be (approximately) in the same horizontal plane as the projector lenses, it will be seen that it is essential to utilize the upper portions (or lower portions, where available) of the concentric elements rather than those at the side positions, i. e. those in or near the same horizontal plane, as there the reflected rays from both lenses $P_r$, $P_l$ tend to coincide.

From Fig. 7 it will further be seen that the cones of reflected light form, where they cross, two rhombic figures (or diamonds), one for each eye, and all that is necessary for the eyes is to be within these diamonds. The smaller the ratio of the length of the picture to the diameter of the concentric elements used, the greater is the vertical height of the rhombic figures and the freedom in vertical movement of the observer. These rhombic figures can be made visible experimentally by placing a white sheet in the position of an observer.

Additional steps described later may be used to increase and extend the tolerances in this direction so that the vertical movement permissible may take in the ground floor and balcony seats.

As in television and block-making the detail observable obviously depends on the number of elements per unit area of the picture and it is therefore determined by the field of vision presented by the picture and the number of elements therein. However it is useless to place the elements on the projection screen closer together than that distance which can subtend the angle of resolution of the eye. Placing them closer than this increases the brilliance of the picture, but does not increase the detail.

In order to serve several files of observers at once, as is required in cinematography, several sets of concentric reflecting elements $a^1$, $b^1$, $c^1$ . . . $a^2$, $b^2$, $c^2$ . . . etc., are provided on the projection screen A the sets having their centres in spaced relationship. This is diagrammatically shown in Fig. 1.

Figure 11:
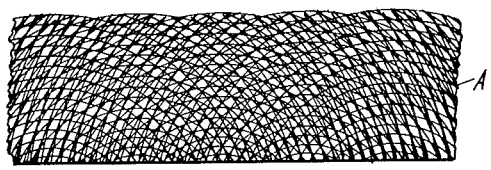
Fig. 11 shows portion of a screen for several files of observers.

A portion of a screen for a number of files having axes which intersect the plane of the screen at equidistant points $C^1$, $C^2$, $C^3$ . . . is shown in Fig. 11. With this arrangement each reflecting element is then intersected by a large number of other elements, the average number of intersections being proportional to the number of sets and to the number of concentric elements therein. Each intersection renders a portion of the intersecting elements ineffective and may produce disturbing reflections. The extent of the imperfections so caused plainly depends also on the distance between the elements and on the width of each element. Therefore such imperfections are reduced by increasing the spacing of the elements and also by a reduction of the width of each element. The loss in brilliance of the picture due to the reduction in the number and width of reflector elements may be compensated by an increase in the power or intensity of the source of illumination.

From a theoretical point of view the spaces between the concentric elements should be either completely reflecting or completely light absorbing in which case no picture can be seen unless the observer is in a specified position. Such conditions can easily be filled by using mirror surfaces or highly polished metal to form the screen.

Experiments, however, have shown that even with imperfectly reflecting or diffusing surfaces between the concentric elements three-dimensional pictures could be seen without disturbance as they stand out from the "flat" picture produced by the imperfect reflecting surface elements. Provided that each eye receives a greater quantity of light from the correct projector than from the wrong projector, the stereoscopic effect still takes place. Hence the spreading of light rays due to diffusion does not seriously hamper the vision and, on the contrary, increases the tolerance. For example in cases where the eyes would fit either inside or outside the cones of reflected rays in Fig. 8, diffusion can so spread the cones that satisfactory viewing is still possible. This increase in tolerance due to diffusion has been noticed during many experiments when the lenses of the projectors were placed deliberately so far apart that the eyes of the observer fell between the cones and consequently no result was expected.

From the foregoing it is evident that considerable latitude is possible in the mechanical construction of the screen.

In order to avoid undesired colour effects due to interference or other reasons it is advisable to have the surface of the grooves cut or formed otherwise as smooth as possible.

When a bundle of light rays falls on a section of the groove or ridge the rays are obviously reflected in many directions. This is shown for a groove $a$ in Fig. 12, where $x$ designates a bundle of substantially parallel rays from a projector, and $z$ the rays reflected from the surface of the groove $a$.

Only those rays which reach the eyes of the observers are useful. Hence the parts of the groove shown in dotted lines in Fig. 12 may be eliminated altogether (and the groove profiled as required) the width of the groove is reduced which in a previous paragraph of this specification has been stated to be of advantage.

The elimination of unnecessary curved surface parts of the grooves i. e. their proper profiling, has the further advantage that observers in different files, or planes (for instance on the floor and on the balcony of a theatre) will not be disturbed by reflections from grooves not destined to be seen by them.

The same considerations apply to ridges and it is therefore obvious that reflecting circular ridges on screens according to this invention should be restricted in substantially the same manner.

To extend the permissible vertical movement of an observer, the vertical lens apertures may be increased accordingly.

Another way of achieving the same result consists in providing a number of sets of concentric elements for each file on centres slightly vertically displaced. For theatres with a balcony separate sets of concentric elements are preferably formed for both the floor and the balcony.

Figure 13:
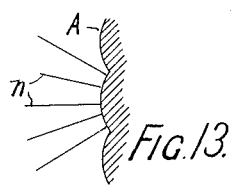
Figs. 13 and 14 show in cross section a screen having, respectively, in addition to the optically effective elements, horizontal lenticulations and vertical facets.

A more complicated mechanical construction of the screen comprises the forming in the surface of the screen of lenticulations or facets about horizontal axes, separated by distances less than that which can be resolved by the eye, and forming the concentric elements on the surface of these lenticulations. A cross section through a screen A of this kind is shown in Fig. 13 which however does not depict the concentric elements.

Alternatively these lenticulations may be formed on a separate transparent screen placed in front of the reflector screen. It will be understood that with such lenticulations there are numerous planes of normals $n$ and that it is therefore probable that for each reflecting element one group of normals at least will bisect the angle subtended by the projector and the eyes of an observer on a different plane. Deflection of the normals only occurs in a vertical direction and does not cause any dislocation of reflected rays from the projector lenses in a horizontal direction and so does not cause confusion between the stereoscopic images.

Another way of dealing with a theatre having a balcony or balconies and a ground floor is to use optical means which place effective images of the projector lenses in suitable positions to serve the balcony or balconies.

If a single screen has to serve a considerable number of files of observers and if, consequently, a sufficient number of sets of concentric elements is difficult to place on the screen, it is possible to form the screen with a series of flat vertical facets $f$, or strips of a width less than the distance which can be resolved by the eye, the strips being placed at angles for so deflecting portions of the planes of the normals to the element that for each additional file of observers a series of strips exist on the screen. It should be noted that for this purpose lenticulations cannot be used.

Figure 14:
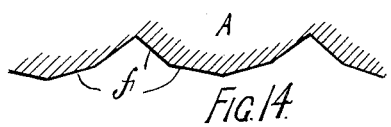

A horizontal cross section through a screen A having facets $f$ is represented diagrammatically in Fig. 14. For example, if a hundred files of observers are to be served, then ten sets of facets and ten sets of concentric elements may be used for this purpose. An arrangement of this kind is difficult to depict clearly on a drawing because of the obtuse angles at which the facets meet. Therefore only a small number of facets $f$ is shown in Fig. 14.

The same result may be obtained in a simpler manner by providing additional synchronised projectors in suitable arrangement, or by producing optically additional effective images of the projector lenses suitably remote from the projector itself in a horizontal direction. This can be done, for instance, by projecting the images onto a reflecting surface provided with vertical sections disposed at appropriate angles for projecting the reflected images directly onto the stereoscopic screen.

Figure 15:
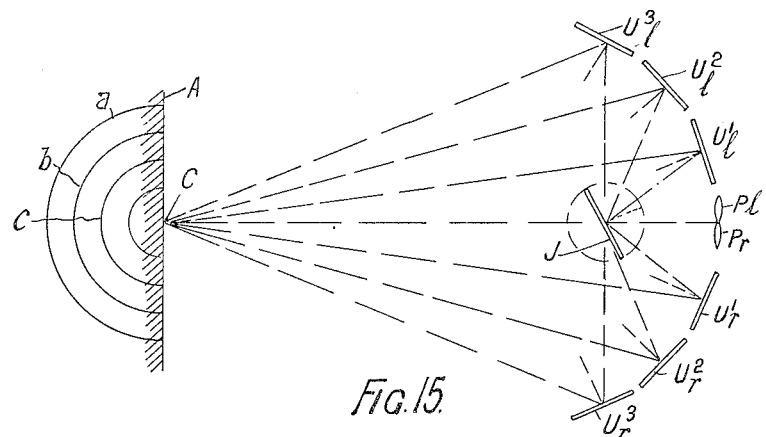
Fig. 15 illustrates a system according to the invention employing a movable reflector and fixed mirrors for the purpose of serving several files of observers.

A further comparatively simple combined optical and mechanical method of serving a large number of observers comprises the use of an arrangement as depicted in Fig. 15. In that arrangement A is the screen and $a, b, c \ldots$ are a series of reflector elements (grooves or ribs) concentric with respect to a centre C. In front of the projector $P_l$, $P_r$ is a rotating mirror J and laterally at either side of the projector are a number of plane mirrors $U_l^1$, $U_l^2$, $U_l^3$ and $U_r^1$, $U_r^2$, $U_r^3$ respectively, at different fixed angles with respect to the axis defined by the projector and the point C. It will be understood that due to the rotation of the mirror J the rays reflected therefrom are made to move angularly in a horizontal plane. Thus the fixed mirrors provide intermittent effective images of the projector, each image being suitable for a particular file of observers. It is of course necessary in this case, to take some steps to prevent the motion of the image on the screen. This may be done in various ways for instance by controlling the illumination source of the projectors so that the image exists only for a few microseconds at appropriate instants of time. Means for effecting such control may comprise either mechanical shutters or, more conveniently, a source of light such as a super-high pressure mercury lamp. Another method of achieving the same effect may comprise an arrangement for rotating the mirrors $U_l^1$, $U_l^2 \ldots U_r^1$, $U_r^2 \ldots$ at an appropriate rate and in a proper direction.

It will be understood that the method described with reference to Fig. 15 is also applicable to files of observers in different planes.

A screen suitable for serving a large number of files may conveniently be built up of a number of vertical screen strips of a width corresponding to the distance between the centres of two adjoining sets of elements, provided each strip is formed with all elements suitable for the maximum number of files it has to serve. The pattern of such strips repeats itself in a horizontal direction and thus the method described lends itself to the mass production of screens according to this invention. As the pattern does not necessarily repeat itself in a vertical direction, this master strip should be made of a length corresponding to the maximum height likely to be encountered in practice.

It is a fact well known to every expert that the laws applicable to reflectors are with obvious modifications valid for transparent or light refracting bodies and materials as well. Therefore screens according to the present invention may, if so desired, be made of such refracting materials, such as glass, transparent plastics or, preferably, of moulded gelatine on glass or the like. The essential difference in the arrangement of the projectors and observers in relation to the screen lies in the fact that for refracting screens the projectors and observers are on opposite sides of the screen, as distinct from reflectors where the projectors and observers are necessarily on the same side of the screen.

Figure 16:
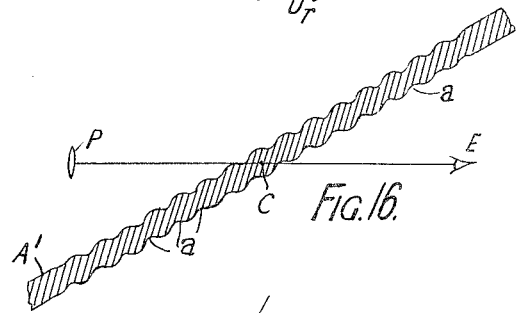
Fig. 16 is a cross section through a refracting screen according to this invention, illustrating a certain property of such screen.

It may prove to be an advantage for specific applications that a refracting screen will operate whatever its angular inclination with respect to a line between an observer and a projector. This is due to the fact that each set of concentric elements on a refracting screen according to this invention may be contemplated to constitute a lens. For lenses, however, it is well known that the production of a real image is, within limitations, widely independent of the angular position of the image-producing object with respect to the lens. This will be more clearly understood from Fig. 16, which shows in cross section a refracting screen $A^1$ having a set of concentric annular grooves $a$ in an arbitrary angular position with respect to the line interconnecting a projector P and an eye E. As a rule a transparent screen also will be placed at right angles to the axis of vision. Fig. 16, however, indicates that the production of a suitable image in the eye of an observer is largely independent of the angle of tilt of the screen.

Another advantage obtainable with refracting screens is that for a larger number of files of observers several such screens may be placed behind each other in staggered relationship and united to a single compound, each screen containing only one, two, or a few sets of optically effective elements in the required relationship to the axis of a selected file or group of files. Thin gelatine screens which absorb only very little light are particularly suitable for this arrangement.

Non-transparent screens, i. e. screens for observers and projectors on the same side thereof, can be made of metal, for instance electrolytically polished aluminium, polished Monel metal or stainless steel, zinc or aluminium sheets of the kind used by engravers. Alternatively such screens may be made of other opaque materials, or of transparent or translucent materials mirrored at one side thereof, including screens carrying a layer of gelatine on glass.

The formation of the grooves or ribs on the screen may be effected in various manners, for instance by embossing, by engraving with steel ball pointed tools, or by a moulding process.

Polishing of the optically non-effective surface elements may be carried out by any suitable method, if required. Alternatively these elements may be coated with a varnish or may otherwise be made light-absorbing if this should be desired.

A screen made in accordance with the present invention can be used variously. In combination with a pair of stereoscopic projectors arranged as aforedescribed it may be used for the viewing of simple stereoscopic slides or films, or for television, by observers placed in files as defined above.

Figure 17:
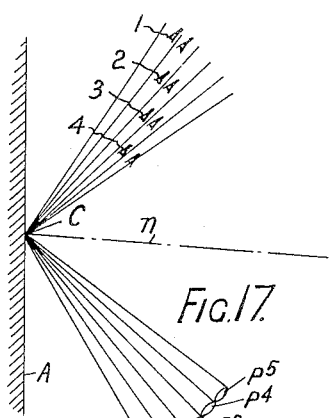
Fig. 17 illustrates diagrammatically the utilisation of the system according to the invention for producing "all-round" views of an object.

However it may also be used for producing a continuous "all-round" view of an object, if combined with a number of laterally displaced projectors in an arrangement substantially as shown in Fig. 17, showing pictures of the same object from progressively varying viewpoints. Referring to this figure it will be seen that an observer moving through the positions indicated by 1, 2, 3, 4 . . . will perceive, in succession, the three-dimensional pictures produced by the pairs of projectors $P^1 P^2$, $P^2 P^3$, $P^3 P^4$, $P^4 P^5$, . . . . The laws governing the sequence of the pictures and the movement of the observer are obvious in view of the explanations given above which do not require amplification.

The screen according to the invention may further be used for the simultaneous projection of unrelated pictures which will be visible separately, or jointly, to properly positioned observers. This may be used for advertising purposes and otherwise.

A screen according to the invention is also usable with advantage, for "flat" images (ordinary slides, cinematographic films and televised pictures) as a major portion of the reflected or refracted light is directed towards the positions specified above for the observers, giving high light efficiency.

The description hitherto has been concerned exclusively with circular reflecting or refracting elements on the screen. However as is well known, the geometry of the circle is a special case of the geometry of an ellipse. Hence concentric confocal elliptical elements (grooves, ribs or undulations) may be used with advantage instead of circular elements, for specific positions of observers and/or projectors with respect to the screen.

Figure 18:
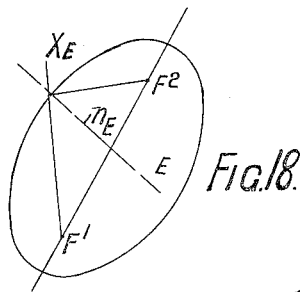
Fig. 18 is a diagram illustrating certain well-known geometrical properties of ellipses.

Fig. 18 illustrates the known fact that a normal $n_E$ to any peripheral point $X_E$ of an ellipse bisects the angle subtended at that point by the two foci $F^1$, $F^2$.

From this it can be developed along lines similar to those adopted for circular elements, that for a file B of observers the projector should be positioned as shown in Fig. 19 at P in the case of a reflecting screen, and at $P^1$ in the case of a refracting screen.

In Fig. 19, which illustrates both cases, $F^1$ and $F^2$ indicate the foci of the elliptical elements (only one of which is shown), B the axis of a file of observers which intersects the screen at $F^1$, and P, $P^1$ the respective positions of the projector.

$\alpha$ is the angle between the axis B and a normal $n_B$ to the screen at $F^1$, $\beta$ the angle between the line joining the projector P with the focus $F^2$, and the normal $n_P$ to the (reflecting) screen A at $F^2$. The angles $\alpha$ and $\beta$ are equal.

$\beta'$ is the angle between the line joining projector $P^1$ with the focus $F^2$, and the normal $n_P$ to the (refractory) screen A at $F^2$. Here again the angles $\alpha$ and $\beta'$ are equal.

If the locations of the observers and projectors are as shown in Fig. 19, all observers in the file B who look towards the section of the major axis between the foci $F^1$ and $F^2$ (the "centre" of the ellipses) would, if unimpeded, perceive the projector P ($P^1$) somewhere on that centre. (In the case of circular elements the centre so defined shrinks into a single point.)

Minor deviations in the relative positions are permissible within the previously indicated tolerances resulting from the finite size of the projector, from diffusion, and as as consequence of the approximations detailed above.

Projecting screens having elliptical elements are convenient under circumstances where it would not be possible to tilt the screen to the angle required for circular elements to suit the position of the observers and projector, for instance in the adaptation of existing theatres to the system according to the present invention.

As may be seen from Fig. 20, it is possible in a system of this kind comprising, for instance, a single projector P (pair of projecting lenses) in front of a reflecting screen A to serve several parallel files $B^1$, $B^2$, $B^3$ . . . of observers with several sets of concentric (confocal) elliptical elements, provided these sets are arranged to have all one focus $F^1$ in common and in coincidence with the point where the projector axis $n_P$ intersects with the plane of the screen A, whilst the second focus $F_2^i$, $F_2^{ii}$, $F_2^{iii}$ . . . of each set coincides with the intersection point of one file axis $B^1$, $B^2$, $B^3$ . . . , respectively, with the screen. Thus with a system according to Fig. 20 the files of observers do not diverge in a direction away from the screen A as is necessarily the case with a system having circular sets of elements (Fig. 1).

As can be seen in Fig. 20, the screen A has left and right side edges and a lower end edge. Although not necessary for the description, the screen A is also provided with an upper end edge. The foci $F^1$, $F^2$, $F^3$ and $F^4$ are positioned between the side edges below the lower end edge and thus are positioned in an area extending beyond the lower end edge and between said side edges. These foci represent, respectively, the intersections of the axes $n_P$, $B^1$, $B^2$ and $B^3$ with the plane of the screen and thus it is clear that the foci lie in the plane of the screen.

The focus $F^1$ together with focus $F^2$ represent the foci of a first set of spaced grooves lying along elliptical paths and extending uninterruptedly between the side edges. Because the foci are positioned in the instance shown, below the lower end edge, there are no lateral portions to the grooves. As previously described, it is desirable that only the upper or lower portions of the grooves be used and this is ensured by the indicated positioning of the foci.

The foci $F^1$ and $F^3$ represent the foci of a further set of elliptical grooves, while the foci $F^1$ and $F^4$ represent the foci of still another set of elliptical grooves provided on the screen. It follows that all of the grooves of any one of the sets are confocal on the same two foci.

Figure 12:
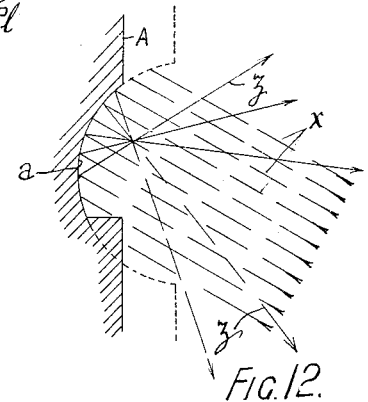
Fig. 12 is a cross section through a single groove on a screen according to this invention, illustrating measures for the elimination of undesired dispersion.

The cross-sections of these elliptical grooves are governed by the same principles as the cross-sections of the circular grooves previously described. Thus, the grooves may be semi-circular in cross-section as shown in Fig. 3. Since only a portion of the cross-section of the groove is effective in transmitting rays to the eye of the observer, however, the cross-section may constitute a circular arc of less than 180° and, moreover, may be profiled as shown in Fig. 12. Fig. 5 shows the cross-sections of all the grooves to be substantially constant and further shows that only a portion of the groove is effective which accordingly permits use of grooves of less than 180° in cross-section.

The projector in Fig. 20 is positioned along the normal $n_p$ which intersects the plane of the screen at $F^1$ and thus is also positioned, in the present instance as shown, below the lower end edge of the screen since the focus $F^1$ was previously described as also located below the lower end edge. The same effects would, of course, be realized if the screen, the projector and the files were inverted since their relative positions would not be affected. In this event the foci and projector would be positioned above the upper end edge of the screen but the image received by the observers would be the same.

I claim:

1. A system for stereoscopically viewing a pair of projected images comprising a planar screen having an optically polished surface defined between a pair of side edges and a pair of upper and lower end edges, said surface being provided with a set of spaced grooves lying along elliptical paths in the plane of said screen, said grooves extending uninterruptedly between said side edges and being confocal on two foci positioned in the plane of said screen and in an area extending beyond said end edges and defined by said side edges, the cross-section of said grooves being substantially constant and corresponding at least in part to a circular arc, and stereoscopic means positioned to project a pair of images on said screen, one of said images to be viewed by the right eye of an observer and the other of said images to be viewed by the left eye of said observer, said projecting means being spaced from the plane of said screen and positioned at a location beyond the end edges of the latter, whereby light rays from each of said images are bent by said grooves so that rays from one of said images are received by one eye of said observer while they are not received by the other eye of said observer.

2. A system according to claim 1, wherein a plurality of sets of elliptical grooves are provided, the grooves of each set being confocal on two foci, respectively.

3. A system according to claim 2, wherein all of said sets of elliptical grooves have one focus in common, said sets intersecting each other.

4. A system according to claim 1, wherein said two foci are coincident, said elliptical grooves therefore being concentric circular grooves.

5. For use in a system for the projection of stereoscopic and like images; a planar screen having an optically polished surface defined between a pair of side edges and a pair of upper and lower end edges, said surface being provided with a set of spaced grooves lying along elliptical paths in the plane of said screen, said grooves extending uninterruptedly between said side edges and being confocal on two foci positioned in the plane of said screen and within an area extending beyond said end edges and defined by said side edges, the cross-section of said grooves being substantially constant and corresponding at least in part to a circular arc.

References Cited in the file of this patent

UNITED STATES PATENTS

| | | |
|---|---|---|
| 1,279,262 | Clark | Sept. 17, 1918 |
| 1,293,380 | Dugan | Feb. 4, 1919 |
| 1,535,985 | Clark | Apr. 28, 1925 |
| 1,550,880 | Clark | Aug. 25, 1925 |
| 1,883,290 | Ives | Oct. 18, 1932 |
| 1,885,208 | Koeppe | Nov. 1, 1932 |
| 2,045,119 | Carpenter | June 23, 1936 |
| 2,055,118 | Carpenter | Sept. 22, 1936 |
| 2,075,853 | Kanolt | Apr. 6, 1937 |
| 2,132,405 | Draeger | Oct. 11, 1938 |
| 2,146,135 | Adams et al. | Feb. 7, 1939 |
| 2,154,868 | Genies | Apr. 18, 1939 |
| 2,273,074 | Waller | Feb. 14, 1942 |
| 2,280,206 | Waller et al. | Apr. 21, 1942 |
| 2,313,947 | Klinkum | Mar. 16, 1943 |
| 2,351,033 | Gabor | June 13, 1944 |
| 2,351,034 | Gabor | June 13, 1944 |

FOREIGN PATENTS

| | | |
|---|---|---|
| 750,155 | France | May 22, 1933 |
| 505,673 | Great Britain | May 16, 1939 |
| 538,093 | Great Britain | July 21, 1941 |
| 541,753 | Great Britain | Dec. 10, 1941 |
| 267,732 | Switzerland | Aug. 21, 1947 |